US012476990B2

(12) United States Patent
Shachar et al.

(10) Patent No.: US 12,476,990 B2
(45) Date of Patent: Nov. 18, 2025

(54) METHOD AND SYSTEM FOR EARLY DETECTION OF MALICIOUS BEHAVIOR BASED USING SELF-SUPERVISED LEARNING

(71) Applicant: Skyhawk Security, Ramat Gan (IL)

(72) Inventors: Amir Shachar, Ramat Gan (IL); Chen Burshan, Omer (IL); Peled Eldan, Ramat Hasharon (IL)

(73) Assignee: Skyhawk Security, Ramat Gan (IL)

( * ) Notice: Subject to any disclaimer, the term of this patent is extended or adjusted under 35 U.S.C. 154(b) by 313 days.

(21) Appl. No.: 18/195,963

(22) Filed: May 11, 2023

(65) Prior Publication Data

US 2024/0380766 A1   Nov. 14, 2024

(51) Int. Cl.
*H04L 9/40* (2022.01)
(52) U.S. Cl.
CPC .......... *H04L 63/1425* (2013.01); *H04L 63/20* (2013.01)
(58) Field of Classification Search
CPC ............................ H04L 63/1425; H04L 63/20
See application file for complete search history.

(56) References Cited

U.S. PATENT DOCUMENTS

| | | | | |
|---|---|---|---|---|
| 9,386,030 | B2* | 7/2016 | Vashist | H04L 63/1425 |
| 11,290,483 | B1* | 3/2022 | Kannan | H04L 63/1433 |
| 2016/0173516 | A1* | 6/2016 | Raugas | G06N 7/01 726/23 |
| 2020/0213325 | A1* | 7/2020 | Scherman | H04L 63/1425 |

* cited by examiner

*Primary Examiner* — Vance M Little
(74) *Attorney, Agent, or Firm* — Rivka Friedman (57) ABSTRACT

Computerized methods and systems obtain threat data generated from activity data using unsupervised learning. The activity data is collected from enterprises and describes activities performed on the enterprises. The threat data indicates likelihood that sequences of activities performed on the enterprises are indicative of malicious intent. A supervised ML model that processes sequential data is trained by providing a training set of sequential data to the supervised ML model. The training set includes at least some of the obtained threat data, and data derived from activity data collected from at least some of the enterprises. The trained supervised ML receives new data that describes a sequence of activities performed on an enterprise, and processes the received new data to produce a prediction of whether the sequence of activities performed on the enterprise will lead to a malicious action on the enterprise. In some embodiments, multiple supervised ML models are used.

18 Claims, 5 Drawing Sheets

METHOD AND SYSTEM FOR EARLY DETECTION OF MALICIOUS BEHAVIOR BASED USING SELF-SUPERVISED LEARNING

TECHNICAL FIELD

The present disclosure relates to methods, systems, and computer program products for detecting malicious behavior in enterprises and enterprise networks.

BACKGROUND OF THE INVENTION

Threat detection and response are critical for protecting enterprise systems against security threats, such as malware and other malicious attacks. Many conventional techniques for protecting against malicious attacks rely on analyzing malicious behavior indicators, typically defined by security professionals, to score behavioral sequences of users in the enterprise system. However, these indicators often only indicate that an attack is already taking place.

SUMMARY OF THE INVENTION

The present disclosed subject matter, also referred to herein as the disclosure, includes methods, systems, and computer program products for detecting malicious behavior in enterprises. Aspects of the present disclosure provide early detection of enterprise threats, that upon initial analysis by conventional threat detection systems may not appear as malicious or are seemingly benign, before those threats manifest into full-scale malicious attacks on the enterprises. This early detection is enabled by using a variation of self-learning, in which activity data (e.g., activity logs) from enterprises is processed together with collected threat data (that is also derived from the activity data and includes triggered alerts) to extract patterns that provide new insights on the activity data that is not described by the alerts in the threat data, and to predict outcomes. In certain embodiments, an unsupervised learning algorithm is applied to the activity data to detect anomalies in the activity data. The output of the anomaly detection is threat data, carrying anomaly scores for the activity data. Based on the anomaly scores in the threat data, one or more supervised learning models is trained in order to be able to extract relevant features from activity data. This approach can be seen as a new type of self-supervised learning because it is capable of providing a classification of the result based on plain unlabeled data. By using anomaly detection as an unsupervised step, more relevant features can be extracted, even if those features are not explicitly labeled, and predictions can be made as to what sequences of activities/events would trigger alerts by threat detection systems. This approach can potentially improve the quality of feature extraction in a wide range of applications.

Embodiments of the present disclosure are directed to a method for detecting malicious behavior in enterprises. The method comprises: obtaining threat data, the threat data generated from activity data using unsupervised learning, the activity data collected from a plurality of enterprises and descriptive of activities performed in association with the enterprises, the threat data indicating a likelihood that sequences of activities performed in association with the enterprises are indicative of malicious intent; training at least one supervised machine learning model that processes sequential data by providing a training set of sequential data to each of the at least one supervised machine learning model, the training set including at least some of the obtained threat data and data derived from activity data collected from at least some of the plurality of enterprises; and by each of the trained at least one supervised machine learning model, receiving as input new data descriptive of a sequence of activities performed in association with an enterprise and processing the received new data to produce a prediction of whether the sequence of activities performed in association with the enterprise will lead to a malicious action on the enterprise.

Optionally, the threat data is descriptive of sequences of activities performed in association with the enterprises during a first time-interval defined by a first start time and a first end time, and the data derived from the activity data collected from the at least some of the plurality of enterprises is descriptive of activities performed in association with the at least some of the plurality of enterprises during a second time-interval defined by a second start time and a second end time, the second time-interval overlapping with the first time-interval, and the second start time preceding the first end time by a first amount of time.

Optionally, the second end time precedes the first end time by a second amount of time that is less than the first amount of time.

Optionally, obtaining the threat data includes: collecting the activity data from the plurality of enterprises, and generating the threat data from the collected activity data using an unsupervised learning technique.

Optionally, the at least one supervised machine learning model includes a transformer.

Optionally, the at least one supervised machine learning model includes exactly one supervised machine learning model.

Optionally, the at least one supervised machine learning model includes a plurality of supervised machine learning models, each supervised machine learning model trained using different respective parts of the obtained threat data such that each supervised machine learning model predicts a different type of malicious action.

Optionally, training the at least one supervised machine learning model includes identifying patterns in the activity data collected from the at least some of the plurality of enterprises that correspond to at least some of the obtained threat data.

Optionally, processing the received new data includes assigning, by each of the trained at least one supervised machine learning model, a confidence score indicative of a confidence that the sequence of activities will lead to a malicious action.

Optionally, the method further comprises: taking at least one action based on the prediction of whether the sequence of activities performed in association with the enterprise will lead to a malicious action on the enterprise.

Optionally, the at least one action includes modifying a current security posture of the enterprise.

Embodiments of the present disclosure are directed to a computer system for detecting malicious behavior in enterprises. The computer system comprises: a non-transitory storage medium for executing computer components; and a computerized processor for executing the computer components. The computer components comprise: a threat detection module configured to: obtain threat data, the threat data generated from activity data using unsupervised learning, the activity data collected from a plurality of enterprises and descriptive of activities performed in association with the enterprises, the threat data indicating a likelihood that sequences of activities performed in association with the enterprises are indicative of malicious intent, a supervised learning module that processes sequential data and is configured to: train based on a training set of sequential data that includes at least some of the obtained threat data and data derived from activity data collected from at least some of the plurality of enterprises, and once the supervised learning module is trained: receive as input new data descriptive of a sequence of activities performed in association with an enterprise, and process the received new data to produce a prediction of whether the sequence of activities performed in association with the enterprise will lead to a malicious action on the enterprise.

Optionally, the threat data is descriptive of sequences of activities performed in association with the enterprises during a first time-interval defined by a first start time and a first end time, and the data derived from the activity data collected from the at least some of the plurality of enterprises is descriptive of activities performed in association with the at least some of the plurality of enterprises during a second time-interval defined by a second start time and a second end time, the second time-interval overlapping with the first time-interval, and the second start time preceding the first end time by a first amount of time.

Optionally, the second end time precedes the first end time by a second amount of time that is less than the first amount of time.

Optionally, the threat detection module is configured to obtain the threat data by: receiving components of the threat data from a plurality of threat detection subsystems in communication with the plurality of enterprises, and compiling the received components to form the threat data.

Optionally, each threat detection subsystem is configured to: collect activity data from a corresponding one of the of enterprises, and generate a component of the threat data from the collected activity data using an unsupervised learning technique.

Optionally, the threat detection module is configured to obtain the threat data by: collecting the activity data from the plurality of enterprises, and generating the threat data from the collected activity data using an unsupervised learning technique.

Embodiments of the present disclosure are directed to a computer usable non-transitory storage medium having a computer program embodied thereon for causing a suitably programmed system to detect malicious behavior in enterprises, by performing the following steps when such program is executed on the system, the steps comprising: obtaining threat data, the threat data generated from activity data using unsupervised learning, the activity data collected from a plurality of enterprises and descriptive of activities performed in association with the enterprises, the threat data indicating a likelihood that sequences of activities performed in association with the enterprises are indicative of malicious intent; training at least one supervised machine learning model that processes sequential data by providing a training set of sequential data to each of the at least one supervised machine learning model, the training set including at least some of the obtained threat data and data derived from activity data collected from at least some of the plurality of enterprises; and by each of the trained at least one supervised machine learning model, receiving as input new data descriptive of a sequence of activities performed in association with an enterprise and processing the received new data to produce a prediction of whether the sequence of activities performed in association with the enterprise will lead to a malicious action on the enterprise.

Optionally, the threat data is descriptive of sequences of activities performed in association with the enterprises during a first time-interval defined by a first start time and a first end time, and the data derived from the activity data collected from the at least some of the plurality of enterprises is descriptive of activities performed in association with the at least some of the plurality of enterprises during a second time-interval defined by a second start time and a second end time, the second time-interval overlapping with the first time-interval, and the second start time preceding the first end time by a first amount of time.

Optionally, the second end time precedes the first end time by a second amount of time that is less than the first amount of time.

This document references terms that are used consistently or interchangeably herein. These terms, including variations thereof, are as follows:

A "computer" includes machines, computers and computing or computer systems (for example, physically separate locations or devices), servers, gateways, computer and computerized devices, processors, processing systems, computing cores (for example, shared devices), and similar systems, workstations, modules, and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

Unless otherwise defined herein, all technical and/or scientific terms used herein have the same meaning as commonly understood by one of ordinary skill in the art to which the disclosure pertains. Although methods and materials similar or equivalent to those described herein may be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present disclosure are herein described, by way of example only, with reference to the accompanying drawings. With specific reference to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Attention is now directed to the drawings, where like reference numerals or characters indicate corresponding or like components. In the drawings.

DESCRIPTION OF THE PREFERRED EMBODIMENTS

The present disclosure is directed to methods, systems, and computer program products for detecting malicious behavior in enterprises.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the examples. The disclosure is capable of other embodiments or of being practiced or carried out in various ways.

As will be appreciated by one skilled in the art, aspects of the present disclosure may be embodied as a system, a method, or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present disclosure may take the form of a computer program product embodied in one or more non-transitory computer readable (storage) medium(s) having computer readable program code embodied thereon.

Figure 1:
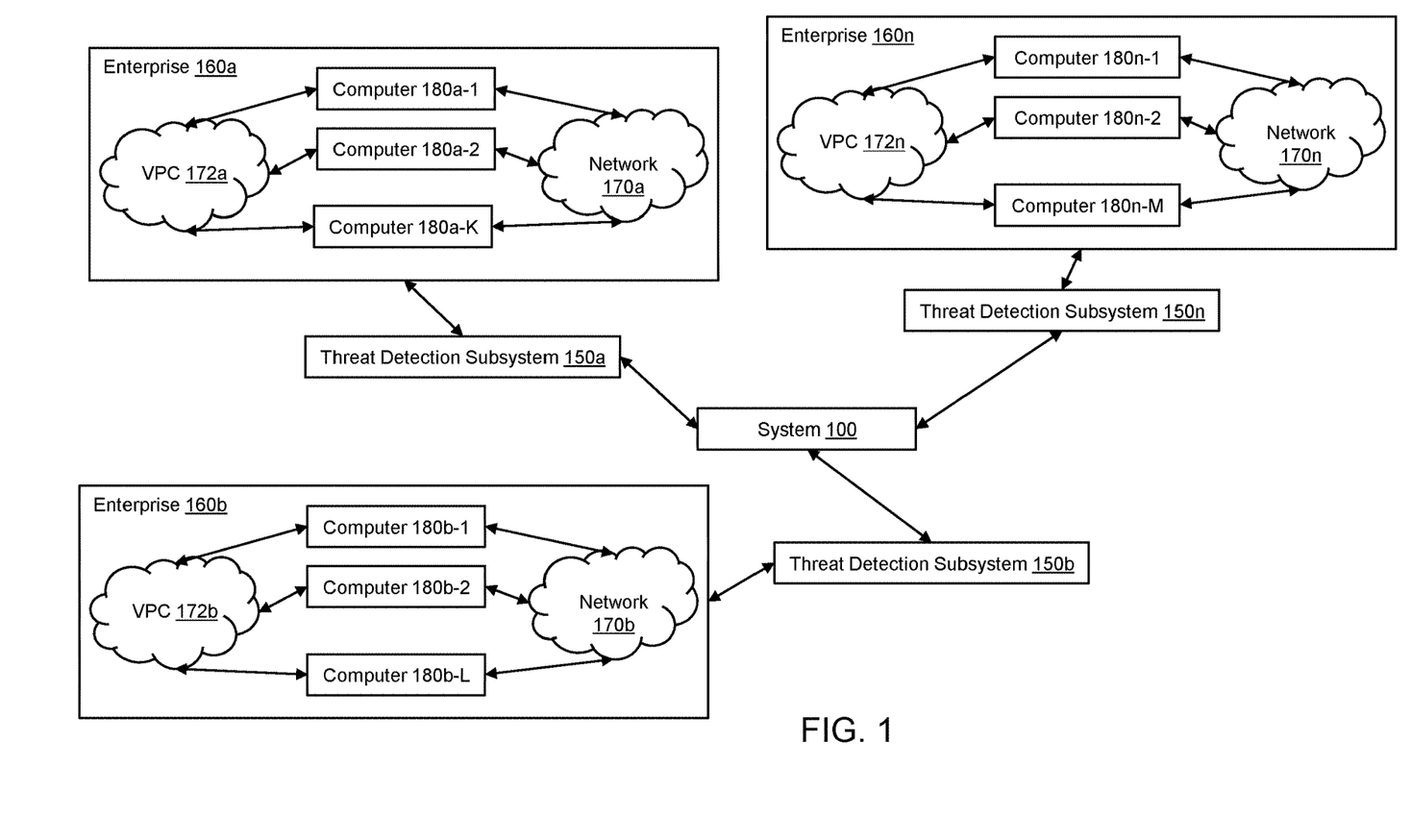
FIG. 1 is a diagram illustrating a system environment in which embodiments of a system according to the disclosed subject matter can operate.

Refer now to the drawings, FIG. 1 shows an example environment in which the disclosed subject matter can operate according certain embodiments. As illustrated, a system 100 according to embodiments of the disclosure is connected, for example via one or more networks (not shown), to threat detection subsystems 150a-150n, which function to monitor the structure of the environment of corresponding enterprises 160a-160n to generate threat data. Parenthetically, "n" denotes the last number of a series, and can be any positive integer value, typically greater than or equal to 2. In the illustrated embodiment, each threat detection subsystem is connected to a respective enterprise, for example via a one or more networks (not shown).

Each of the enterprises 160a-160n (each for example used by a respective organization such as a company, corporation, university, etc.) includes a plurality of computerized devices, including computers (e.g., endpoint client computers), servers, gateways, databases, or any other type of device that falls within the definition of a "computer" as defined above, that are connectable to, or form part of, one or more networks of the enterprise, including one or more virtual private clouds (VPCs). Thus, for example, the enterprise 160a can support computers 180a-1-180a-K (where "K" can be any positive integer) that are linked or otherwise connectable to one or more networks of the enterprise 160a, including, for example network 170a and VPC 172a. Similarly, for example, the enterprise 160b can support computers 180b-1-180b-L (where "L" can be any positive integer) that are linked or otherwise connectable to one or more networks of the enterprise 160b, including, for example network 170b and VPC 172b. Similarly, for example, the enterprise 160n can support computers 180n-1-180n-M (where "M" can be any positive integer) that are linked or otherwise connectable to one or more networks of the enterprise 160n, including, for example network 170n and VPC 172n.

As mentioned, each of the threat detection subsystems 150a-150n functions to monitor the structure of the environment (preferably the virtual cloud environment) of the enterprise 160a-160n to which the threat detection subsystem is connected, and to generate threat data therefrom. The structure of the environment of an enterprise typically includes static parameters, for example, links and/or connections between VPC components, including, for example, connections between databases and gateways of the enterprise, open ports, exploitations of ports, etc.

In particular, each threat detection subsystem monitors the (cloud) environment of its corresponding enterprise for suspicious activity occurring on or in relation to the enterprise over a period of time, and generates from the environment monitoring data sets, for example including threat data, using an unsupervised learning technique. The suspicious activity can include, for example, activity that is indicative of, or is otherwise associated with, malicious attacks on the enterprise.

Parenthetically, in certain embodiments, the threat detection subsystems 150a-150n can form part of the system 100, whereas in other embodiments the threat detection subsystems 150a-150n can be separate from the system 100 and provide input to the system 100. In yet further embodiments, one or more components of the system 100 can be configured to perform the functions of the threat detection subsystems 150a-150n.

Generally speaking, the threat detection subsystems 150a-150n generate their data sets (threat data) from collected activity data (for example log data) using unsupervised learning. The activity data is collected by each threat detection subsystem from its corresponding enterprise, and is descriptive of activities performed in association with the enterprise, for example by computerized devices of the enterprise, over a given period of time. These activities can also be referred to as "events". The threat data, generated by each threat detection subsystem, carries sequence data, in the form of sequences of activities, that can trigger security alerts based on, for example anomaly detection. The triggered security alerts are indicative of malicious intent, i.e., potential threats to the enterprise. The threat data generated by each threat detection subsystem provides an indication of the likelihood that sequences of activities performed in association with the corresponding enterprise (i.e., sequences of events occurring on the enterprise) over the given time period are indicative of malicious intent, i.e., the threat data provides a likelihood that the sequences of activities will lead to future "full-scale" malicious actions taking place on the enterprise.

Each of the threat detection subsystems 150a-150n typically generates its data set (threat data) by collecting and processing activity data, for example log data (e.g., activity logs) that is generated by the corresponding enterprises 160a-160n. The activity logs produced by the enterprises correspond to activities performed over a given period of time, and are typically stored as data types/formats that use human-readable text, for example in JavaScript Object Notation (JSON) format. Some non-limiting and non-exhaustive examples of suspicious activities or events in the activity logs which can trigger security alerts, i.e., generation of threat data (from activity log data), by the threat detection subsystems include: the error rate of a specific user (e.g., one of the enterprise computers) being higher than a predefined threshold, a user (e.g., one of the enterprise computers) applying an API that is not common to the user group it belongs to, and one or more machines (computers) of the enterprise being invoked at an unusual rate.

It is noted that conventional cloud security systems may treat the activities of a given sequence of activities/events (when taken alone or as a sequence) as benign activities, as the activities may occur over a period of time during which malicious actors do not actively perform malicious actions, but rather perform inspection activities such as vulnerability scanning to identify vulnerabilities in the enterprise. In fact, it has been shown that malicious actors (i.e., attackers) often spend several weeks or more performing inspection activities before commencing the actual (i.e., full-blown) attack on the devices of the enterprise. Because malicious actors spend long periods of time (e.g., several weeks) performing inspection activities, large quantities of threat data, indicative of malicious intent and covering large periods of time, can be gathered on attackers, and made available to the system 100 according to the embodiments of the disclosure to generate preemptive alerts on the forthcoming attacks. As will become apparent from the subsequent description, the system 100 according to embodiments of the present disclosure is operative to utilize the generated threat data (covering large periods of time, e.g., several weeks) to train a supervised machine learning (ML) model (or models) to identify sequences of activities that could lead to future malicious actions, thereby enabling the system 100 to identify emerging threats before those threats manifest into a full-blown malicious attack.

According to a non-limiting example embodiment of the present disclosure, threat data can be generated according to the following methodology. Each of the threat detection subsystems 150a-150n collects log data from its corresponding enterprise, and aggregates log data collected over short periods (for example 10 seconds, i.e., "bursts") in different granularities. Each set of aggregated data is then used by the threat detection subsystem to calculate malicious behavior indicators (MBIs) upon which sequences of activity are built by each threat detection subsystem. Each of the threat detection subsystems 150a-150n uses an unsupervised learning technique, such as anomaly detection, for example the Snorkel algorithm, to infer from the MBIs whether the sequences of activity are indicative of malicious intent. For example, using the unsupervised learning technique, each threat detection subsystem can produce a score for each sequence of activities which indicates how likely a sequence of activities leads to something malicious occurring on the enterprise (for example a score between 1 to 10, with 1 being the least likely and 10 being the most likely). As a result, each of the threat detection subsystems 150a-150n is operative to generate threat data that can include one or more sequence of activities and an inference of how likely each sequence is associated with a malicious action (for example an exfiltration) occurring on or otherwise in association with the enterprise.

The system 100 according to embodiments of the present disclosure is operative to function according to a self-supervised learning scheme, in which the threat data (generated from the collected log data using unsupervised learning) is used to train one or more supervised ML models in order to identify of sequences of activities that could lead to future malicious actions, which enables the taking of preemptive actions, such as proactive changes to the security posture of enterprises.

Figure 2:
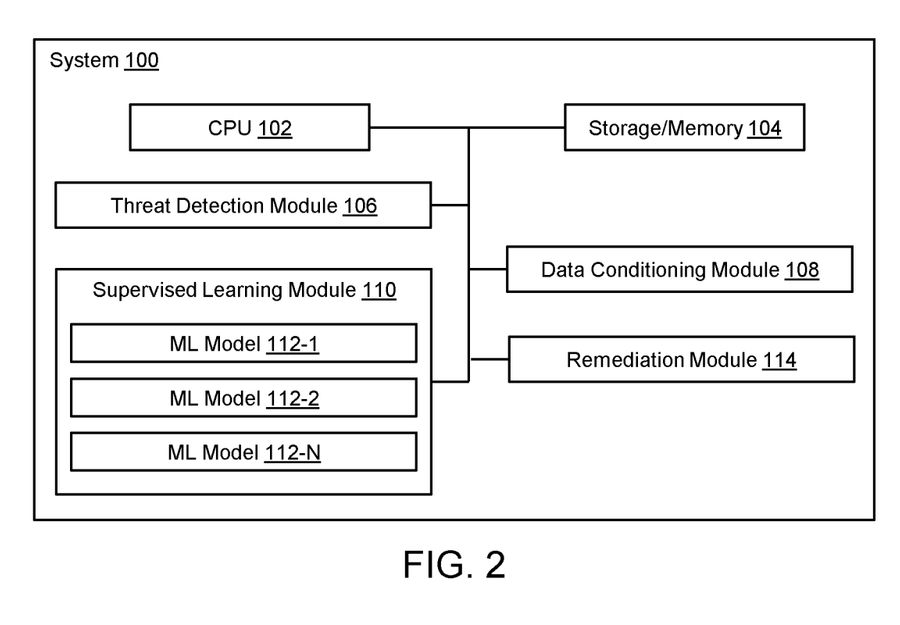
FIG. 2 is a diagram of the architecture of an exemplary system embodying the disclosed subject matter.

With continued reference to FIG. 1, refer also to FIG. 2 which shows an example architecture of the system 100 according to a non-limiting embodiment of the present disclosure. The system 100 includes multiple components in hardware and/or software. Although the components of the system 100 are shown in a single block, the components do not all have to be collocated. For example, the components of the system 100 can be spread throughout different location, and can be connected to each other through one or more networks, for example a cloud network.

The system 100 includes one or more processors in a central processing unit (CPU) 102 linked to storage/memory 104. The CPU 102 is in turn, linked to components (computerized components or modules), such as a threat detection module 106, a data conditioning module 108, a remediation module 114, and a supervised learning module 110 which includes at least one supervised machine learning (ML) model, illustrated as ML models 112-1 through 112-N, where "N" can be any positive integer. The ML model(s) 112-1 through 112-N are each preferably implemented as a ML model that processes sequential data. A transformer is one example of a ML model that processes sequential data and that has been shown to provide good performance. However, other sequential data processing ML models can be used, including, for example, recurrent neural networks, autoencoders, generative models, and the like.

While these components 102 through 110 are the most germane to the system 100, other components are permissible. Parenthetically, the term "linked" as used herein, includes both wired and/or wireless links, either direct or indirect, such that the components 102 through 110, are in electronic and/or data communications with each other, either directly or indirectly. As used herein, a "module", for example, includes a component for storing instructions (e.g., machine readable instructions) for performing one or more processes, and including or associated with processors, e.g., the CPU 102, for executing the instructions.

Figure 3:
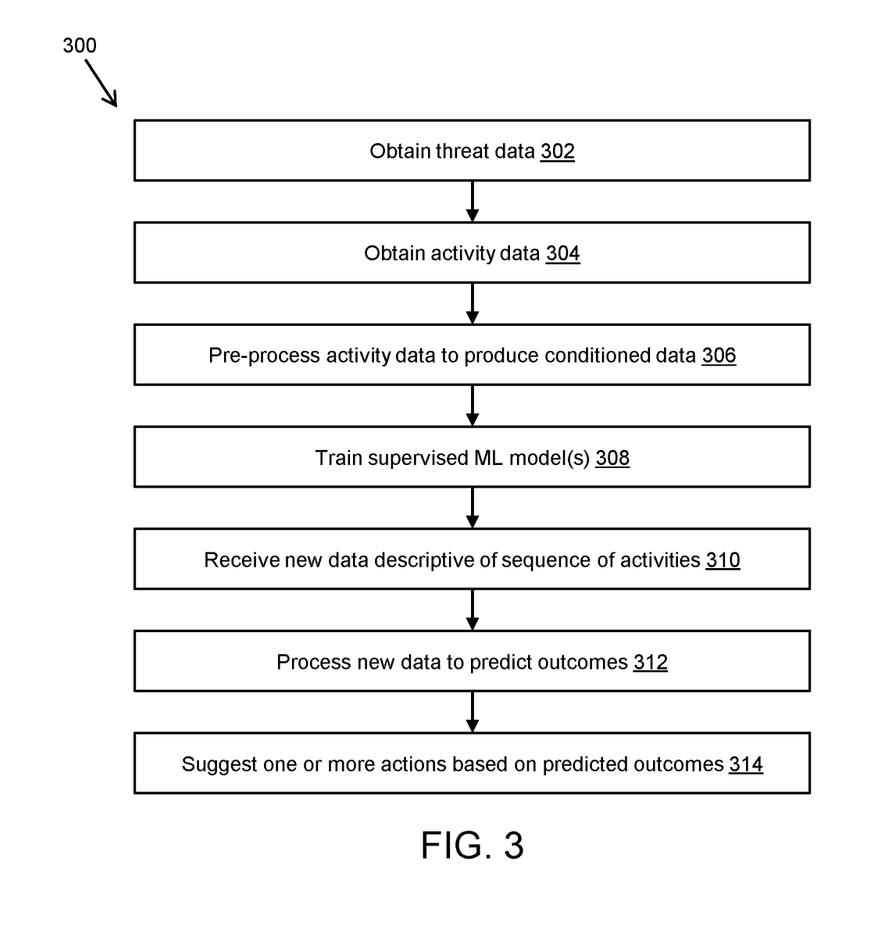
FIG. 3 is a flow diagram illustrating a process for detecting malicious behavior in enterprises using processed data logs and generated threat data to train one or more supervised learning models, according to embodiments of the present disclosure.

The CPU 102 is formed of one or more processors, including hardware processors, and performs methods of the disclosure, as shown in FIG. 3 and detailed below. The methods of FIG. 3 may be in the form of programs, algorithms, and the like. For example, the processors of the CPU 102 may include x86 Processors from AMD (Advanced Micro Devices) and Intel, Xenon® and Pentium® processors from Intel, as well as any combinations thereof.

The storage/memory 104 stores machine-executable instructions executed by the CPU 102 for performing the methods of the disclosure (e.g., as shown in FIG. 3). The storage/memory 104, for example, may also provide temporary storage for the system 100.

Generally speaking, the system 100 is operative to: i) obtain the threat data that is generated from the collected log data using unsupervised learning (e.g., anomaly detection), where the threat data can, in certain embodiments, be generated by the threat detection subsystems 150a-150n, ii) obtain the log data from which the threat data was generated, iii) train a supervised machine learning model (or models) that preferably processes sequential data (e.g., a transformer) using the obtained threat data and conditioned data derived from the obtained log data, iv) predict future outcomes, using the trained machine learning model(s), from new log data from enterprises, and v) evaluate the security posture of those enterprises.

The aforementioned functions are performed, in certain embodiments, by one or more of the threat detection module 106, the data conditioning module 108, the supervised learning module 110, and the remediation module 114.

As will be discussed, an aspect to the training of the supervised machine learning model(s) lies in the time-interval (i.e., period) to which the obtained threat data corresponds (i.e., the period for which the log data from which the threat data was generated corresponds), and the time-interval to which the conditioned data corresponds (i.e., the period for which the log data from which the conditioned data was derived corresponds).

The threat detection module 106 functions to obtain the threat data. In certain embodiments, the threat detection module 106 functions as a receiver and aggregator (data compiler) that receives the threat data from the various threat detection subsystems 150a-150n and compiles all of the received threat data together. It is noted that in certain embodiments, the functions performed by the threat detection subsystems 150a-150n can be integrated into the system 100, for example as part of the threat detection module 106. Thus, for example, embodiments are contemplated in which the threat detection module 106 includes multiple sub-modules, each being associated with a respective one of the enterprises 160a-160n, and each performing the function of a threat detection subsystem.

The threat data obtained by the threat detection module 106 corresponds to activities performed on the various enterprises over a given time-interval, for example a period of several weeks or months (e.g., a two-month period).

As mentioned above, the system 100 is also operative to obtain the log data from which the threat data was generated. In certain embodiments, the threat detection module 106 can perform functions for receiving this log data (referred to as "raw data", "raw log data", or "raw activity log(s)")), for example via data and/or network connection to the various enterprises 160a-160n. In other embodiments, the threat detection subsystems 150a-150n can provide to the threat detection module 106, together with their generated threat data, the raw data from which the threat data was generated. In yet other embodiments, a separate module (for example the data conditioning module 108 or another module of the system 100) can function to receive the raw data from the enterprises 160a-160n.

The data conditioning module 108 functions to pre-process the raw data in order to build a sequence of aggregated data from the raw data. In certain embodiments, the data conditioning module 108 also functions to pre-process the raw data to convert (transform) the raw data (which, as discussed above, is in a format that uses human-readable text, for example JSON format) into a numerical dataset, as well as other pre-processing functions to vectorize and/or streamline the data. The following paragraphs describe some of the pre-processing that can be performed by the data conditioning module 108.

In certain embodiments, data conditioning module 108 is configured to pre-process the raw data to filter out irrelevant data, aggregate related events, or clean up any anomalies or statistical outliers. In certain embodiments, the data conditioning module 108 is configured to process (i.e., analyze) the logs to identify the features (attributes) that could be relevant for the ML model (or models) of the supervised learning module 110. These features can, for example, include event names, event sources, user identities, source IP addresses, and the like. The choice of features may depend on the problem that is intended to be solved by the ML model (or models) of the supervised learning module 110, as will become apparent in subsequent sections of the present document. For example, if a ML model of the supervised learning module 110 is to be configured to detect unusual API activity, then the threat detection subsystems 150a-150n may focus on features such as event names (e.g., 'CreateBucket', 'DeleteBucket'), event sources (e.g., 's3.amazonaws.com' if the VPC is provided by Amazon), source IP addresses, and user identities (e.g., user ARN, access key ID, etc.).

In certain embodiments, the data conditioning module 108 is configured to encode categorical features. By way of introduction, many features in activity logs (e.g., CloudTrail logs) are non-numeric (categorical) features, and thus the raw activity logs may not be readily in a format that is suitable for use with the ML model (or models) of the supervised learning module 110. In order to convert the data in the activity logs to a format that is suitable for use with the ML model (or models) of the supervised learning module 110, the data in the activity logs should be converted to numerical values. In certain embodiments, the data conditioning module 108 can perform this conversion, referred to as encoding of categorical features. The conversion can be performed using various techniques, for one-hot encoding, label encoding, target encoding, and the like. For example, if the data conditioning module 108 is configured to focus on the 'event name' feature, one-hot encoding can be performed to create a binary column for each unique event name. If there are three unique event names (e.g., 'CreateBucket', 'DeleteBucket', 'ListBuckets'), the data conditioning module 108 can create three binary columns representing each event, with a 1 indicating the presence of that event and a 0 indicating its absence.

In certain embodiments, the data conditioning module 108 functions to normalize numerical features to ensure that the numerical features are on the same scale. This can help improve the performance of the ML model (or models) of the supervised learning module 110. Techniques for normalization include, for example, min-max scaling, standard scaling, robust scaling, and the like. For example, if the processed log data has features representing the number of API calls made within an hour, the data conditioning module 108 could use min-max scaling to normalize this feature by dividing each value by the maximum number of API calls observed.

In certain embodiments, the data conditioning module 108 functions to create new features from the existing features, which can provide additional information for the ML model (or models) of the supervised learning module 110, which can improve the performance of the system 100. Creation of new features can, for example, involve creating interaction terms, aggregating features over time, calculating rolling statistics, and the like. For example, the data conditioning module 108 could create a feature that represents the ratio of 'CreateBucket' events to 'DeleteBucket' events, which could help identify unusual activity patterns.

Once the data conditioning module 108 pre-processes the collected log data to convert the text-based logs into a numerical dataset (for example using the techniques discussed above), as well as to optionally enhance features and/or create new features, the numerical datasets (which are each composed of vectors/sequences) are aggregated by the data conditioning module 108 as sequences (this aggregation is referred to as "conditioned data"). The conditioned data is a sequence of data that represents activities occurring on (or otherwise in relation to) a set of the enterprises (typically at least two) over a given period of time.

It is noted that the conditioned data can, in certain embodiments, be split or sub-divided into two sets, where one set can be used to train the ML model(s) of the supervised learning module 110, and the other set can be used to validate the trained ML model(s).

As alluded to above, the log data that is collected from the enterprises corresponds to a given time-interval, for example a period of several weeks or months, over which the log data is collected. This collected log data is descriptive of activities performed in association with the enterprises. Thus, the conditioned data, that is derived/generated (by the data conditioning module 108) from collected log data, corresponds to the same time-interval as the log data from which the conditioned data was derived/generated. Likewise, the threat data, that is derived/generated (by the threat detection subsystems 150a-150n) corresponds to the same time-interval as the log data from which the threat data was derived/generated. In general, each of the time-intervals is defined by a corresponding start time and end time (or "stop time"). Thus, initially, the conditioned data has a start time and end time, and the threat data has a start time and end time.

In certain embodiments, the system 100 enforces certain time-interval criteria (conditions) in order to train the ML model (or models) of the supervised learning module 110. The time-interval criteria are preferably such that: 1) the time-interval of the conditioned data overlaps with the time-interval of the threat data (i.e., the start time of the threat data falls between the start time and end time of the conditioned data), 2) the start time of the conditioned data precedes the end time of the threat data by a first amount (typically at least a week, and in some cases up to two months), and 3) the end time of the conditioned data precedes the end time of the threat data by a second amount that is less, and preferably significantly less, than the first amount (for example several hours, and in some cases up to 3 or 4 days). For example, the system 100, using for example the data conditioning module 108, preferably ensures that the first amount is a significant amount by ensuring that start time of the conditioned data significantly precedes (i.e., is significantly earlier than) the end time of the threat data, and preferably also ensures that the second amount is less than the first amount by ensuring that the end time of the conditioned data precedes but not significantly precedes (i.e., is earlier, but not significantly earlier than) the end time of the threat data. In the context of the present document, the terms "significantly precedes" and "significantly earlier", when used within the context of a first time-instance that significantly precedes (or is significantly earlier than) a second time-instance, typically mean that the first time-instance is at least one week earlier, and more typically means one month earlier and even up to two months earlier, than the second time-instance. In the context of the present document, the terms "precedes but not significantly precedes" (also referred to as "slightly precedes") and "earlier but not significantly earlier" (also referred to as "slightly earlier"), when used within the context of a first time-instance that precedes (or is earlier than) a second time-instance, typically mean that the first time-instance is at least several hours earlier and more typically means at most a few days earlier, such as three or four days earlier, than the second time-instance.

For example, the system 100, using for example the data conditioning module 108, can ensure that the start time and end time of the conditioned data meet the aforementioned criteria by collecting log data from the enterprises 160a-160n over a fairly wide time-window that has: i) a start time significantly earlier than (i.e., significantly precedes) the start time of the log data from which the threat data was generated, for example a few weeks or one or two months earlier, and ii) an end time that is earlier than (i.e., precedes), for example by a period of few days, e.g., three or four days), the end time of the log data from which the threat data was generated. Alternatively, if the end time of the conditioned data is the same as the end time of the log data from which the threat data was generated, the system 100, using for example the data conditioning module 108, may instead truncate the conditioned data to cut-off the last small sub-interval of time (for example the last few days, e.g., three or four days) so that end time of the conditioned data is earlier (but not significantly earlier) than the end time of the threat data.

Consider, as an example, that the log data from which the threat data is generated corresponds to a time-interval between 10 AM on April 1 and 10 AM on April 8. Thus, the threat data has a corresponding start time of 10 AM on April 1 and a corresponding end time of 10 AM on April 8, and is indicative of a likelihood that sequences of activities performed in association with the enterprises between 10 AM on April 1 and 10 AM on April 8 are associated with malicious actions. Note that the end time of the threat data can be the actual end time of the log data, or can be the time at which an alert for that log data was triggered by the threat detection subsystem. Continuing with this example, consider also as an example that the log data from which the conditioned data is generated corresponds to a time-interval between 10 AM on March 1 and 10 AM on April 8. Thus, the conditioned data may initially have a corresponding start time of 10 AM on April 1 and a corresponding end time of 10 AM on April 8. The data conditioning module 108 can truncate the initial conditioned data, for example by cutting off a few days from the initial end time, for example 3 days. Thus, for example, the final conditioned data may have a corresponding start time of 10 AM on April 1 and a corresponding end time of 10 AM on April 5. Alternatively, the data conditioning module 108 can collect its log data over the period that corresponds to a time-interval between 10 AM on March 1 and 10 AM on April 5, thus negating the need to truncate the conditioned data.

Once the time-intervals of the threat data and the conditioned data are properly set, the data conditioning module 108 can provide the data sets to the supervised learning module 110 in order to train the ML model(s) of the supervised learning module 110.

In general, each ML model (e.g., 112-1, 112-2, etc.) of the supervised learning module 110 functions to train on a training set of sequential data. According to embodiments of the present disclosure, the training set of sequential data includes at least some (and in certain cases preferably all) of the obtained threat data, and at least some of the conditioned data. The ML model(s) is/are trained on the conditioned data (which is sequential data) by processing the conditioned data to learn which types of alerts (described in the threat data) would be triggered within a period of "X amount of time" after the end time of the conditioned data, where the "X amount of time" is the interim period between the end times of the conditioned data and the threat data. Thus, for example, if the conditioned data has an end time that is 3 days prior to the end time of the threat data, the ML model(s) is/are trained to learn which types of alerts (described in the threat data) would be triggered within a period of 3 days after the end time of the conditioned data. Once the ML model(s) is/are trained, the ML model(s) can be used to extrapolate (i.e., predict) alerts beyond that interim period.

In certain embodiments, the ML model(s) is/are trained on the conditioned data of the training set by identifying patterns in the conditioned data that correspond (for example match or partially match above a prescribed threshold) to the threat data of the training set. As discussed above, the conditioned data of the training set has a corresponding start time (referred to as "$T_{start\_c}$") and a corresponding end time (referred to as "$T_{end\_c}$"), and the threat data of training set has a corresponding start time (referred to as "$T_{start\_t}$") and a corresponding end time (referred to as "$T_{end\_t}$"). Also as discussed above, $T_{start\_c} \ll T_{end\_t}$ (i.e., $T_{start\_c}$ is significantly earlier than $T_{end\_t}$), and $T_{end\_c} < T_{end\_t}$ (i.e., $T_{end\_c}$ is slightly earlier than $T_{end\_t}$). Thus, for example, the ML model(s) can be trained by identifying patterns in the conditioned data that match or partially match the portion of the threat data corresponding to the period between $T_{start\_t}$ and $T_{end\_c}$ until the ML model(s) can identify the same or similar patterns the threat data corresponding to the period between $T_{end\_c}$ and $T_{end\_t}$.

Once the ML model(s) is/are trained, the ML model(s) can predict which types of alerts would be triggered after the end time of a new input set of conditioned data (new set of input sequential data). In other words, the ML model(s) can predict whether the sequence of activities (described in the new conditioned data) performed in association with an enterprise will lead to a malicious action (a full-blown attack) on the enterprise. The predictions made by the ML model(s) are based in probabilities (or likelihoods), and thus the ML model(s) can also, as part of the processing of new conditioned data, assign a confidence score that is indicative of a confidence that the sequence of activities will lead to a malicious action.

In certain embodiments, for example in embodiments in which the supervised learning module 110 utilizes a single ML model, for example implemented as a transformer or other neural network, the output layer of the ML model consists of a plurality of output nodes (e.g., neurons), where each node corresponds to a different alert type. Thus, for example, the ML model can be trained on conditioned data and threat data (corresponding to different triggered alerts), in order to enable the ML model to predict which type of alert of malicious action, if any, would be triggered. In other embodiments, for example in embodiments in which the supervised learning module 110 utilizes a plurality of ML models, each ML model can be trained on a different alert type, and thus the output nodes of each ML model can correspond to the same malicious action alert type, but for example with different granularities of confidence.

Parenthetically, as mentioned above the ML model(s) of the supervised learning module 110 are each preferably implemented as a ML model that processes sequential data, such a transformer, recurrent neural network, autoencoder, or generative model. It is noted that given the state of the art as of the filing date of this patent application, embodiments in which the ML model(s) are implemented as transformers may be preferred over those which use recurrent neural networks, autoencoders, or generative models. However, as the state of the art rapidly evolves, new more efficient and powerful ML model(s) may become available which can provide more accurate results than those achievable with transformers, and such ML model(s) also fall within the spirit and scope of the present disclosure. Furthermore, supervised ML model(s) that do not operate on sequential data, such as logistic regression models, decision trees, etc., which may be less efficient/powerful than their sequential data counterparts, can still be used in certain non-limiting implementations of the present disclosure, albeit with potentially less accurate results than those obtained when implementing transformers or similar such ML model(s).

The remediation module 114 functions to process the predictions made by the supervised learning module 110 to suggest actions that can be taken to preemptively prevent malicious actions from taking place on enterprises. As one example, the remediation module 114 can suggest a change to the security posture of an enterprise based on the predictions of the supervised learning module 110. For example, if the supervised learning module 110 predicts malicious actions in the form of exfiltration from an open port as a result of suspicious API calls or gateway-database connections, the remediation module 110 may suggest a change to the security posture of the enterprise by forcing closed certain ports in response to particular API calls or gateway-database connections. As another example, remediation module 114 may suggest not change the security posture of an enterprise based on the predictions of the supervised learning module 110. For example, if the current security posture of an enterprise provides sufficient security against potential threats predicted by supervised learning module 110, or if the confidence of any such predictions is low, no security posture change may be needed.

Attention is now directed to FIG. 3 which shows a flow diagram detailing a computer-implemented process 300 in accordance with embodiments of the disclosed subject matter. This computer-implemented process includes an algorithm for, among other things, detecting (in particular predicting) malicious behavior in enterprises, connected, or otherwise linked to the system 100, using self-supervised learning. Reference is also made to the elements shown in FIGS. 1 and 2. The process and sub-processes of FIG. 3 are computerized processes performed by various components of, or otherwise associated with, the system 100, including the threat detection systems 150a-150n, the threat detection module 106, the data conditioning module 108, and the supervised learning module 110. The aforementioned process and sub-processes of FIG. 3 are for example, performed automatically, but can be, for example, performed manually, and are performed, for example, in real time.

The process 300 begins at step 302, where the system 100 obtains threat data. In certain embodiments, the threat data is generated by the threat detection subsystems 150a-150n, and can be obtained by the threat detection module 106 by receiving and compiling the threat data from each threat detection subsystem. As discussed above, the threat data is generated, using unsupervised learning, from activity data (i.e., log data) collected from a plurality of enterprises. The activity data is descriptive of activities performed in association with the enterprises that occurs over a period of time (i.e., has a start time and an end time). The threat data includes triggered alerts, and provides an indication of a likelihood that sequences of activities performed in association with the enterprises are indicative of malicious intent. In certain embodiments, the sequences of activities described by the threat data can be classified/categorized by alert type.

At step 304, the system 100 obtains activity data that is collected from at least some of the enterprises. This activity data can be obtained, for example, via the threat detection module 106 or the data conditioning module 108, or another module of the system 100. The activity data obtained at step 304 preferably has a start time that is significantly earlier than the end time associated with the threat data obtained at step 302, and preferably has an end time that is (slightly) earlier than the end time associated with the threat data obtained at step 302.

At step 306 the system 100 (for example using the data conditioning module 108) pre-processes the activity data to produce conditioned data.

At step 308, the system 100 trains the ML model(s) of the supervised learning module 110. In this step 308, the ML model(s) is/are trained by providing to each of the ML model(s) a training set of sequential data. The training set includes at least some of the threat data obtained at step 302, and the conditioned data produced at step 306.

Once the ML model(s) is/are trained at step 308, step 310 can be performed, in which the system 100 (for example the threat detection module 106 or the data conditioning module 108, or another module of the system 100) receives new data descriptive of a sequence of activities performed in association with an enterprise. This new data, which is itself sequential data, can also optionally be pre-processed (using the same or similar techniques as applied at step 306) to produce conditioned data.

At step 312, the system 100, in particular the supervised learning module 110, processes the received new data (or conditioned data derived therefrom) to predict outcomes, in particular to produce a prediction of whether the sequence of activities performed in association with the enterprise will lead to a malicious action on the enterprise. The prediction can include a prediction of the type of alert (i.e., the type of alerted malicious action) that would be triggered (by the threat detection subsystem of the enterprise) after the end time associated with the new data. In practice, step 312 can output multiple predictions, including, for example, predictions on the type of alert or types of alerts that would be triggered over various periods of time after the end time associated with the new data (for example a period of 2 days after the end time, a period of 4 days after the end time, a period of 1 week after the end time, and so on). It is noted that each prediction is in essence an estimate of the probability of each alert type being triggered (i.e., "firing") during a period of time after the end time associated with the new data.

In certain embodiments, the processing performed at step 312 can also include assigning a confidence score that is indicative of a confidence that the sequence of activities will lead to a malicious action.

At step 314, the system 100, for example the remediation module 114, may process the predictions to suggest one or more actions that can be taken to preemptively prevent malicious actions from taking place on enterprises. For example, if at step 312 the system 100 predicts with high confidence that a specific alert type will occur 4 days after the end time associated with the new data, the remediation module 114 can suggest a protective action to be taken well before the end of that 4-day period, by, for example, suggesting to the affected enterprise to change its the security posture to prevent malicious actions associated with the predicted alert.

Figure 4:
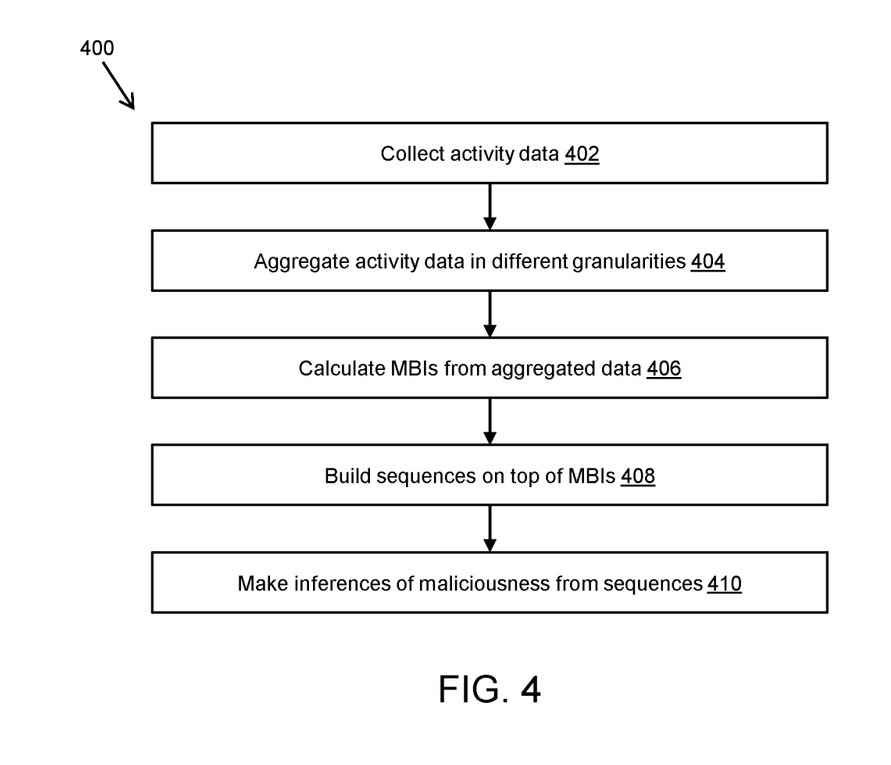
FIG. 4 is a flow diagram illustrating a process for generating threat data to be used for the process of FIG. 3, according to embodiments of the present disclosure.

With continued reference to FIGS. 1-3, refer now to FIG. 4, which shows a flow diagram detailing a computer-implemented process 400 in accordance with embodiments of the disclosed subject matter. This computer-implemented process includes an algorithm for, among other things, performing parts of step 302 of FIG. 3. In particular, the process 400 includes an algorithm for generating threat data from the activity data collected from a single enterprise. This process 400 is generally repeated for each enterprise of the enterprises 160*a*-160*n*. The process and sub-processes of FIG. 4 are computerized processes performed by various components of, or otherwise associated with, the system 100. In certain embodiments, the process and sub-processes of FIG. 4 are performed by the threat detection systems 150*a*-150*n*. In other embodiments the process and sub-processes of FIG. 4 are performed by the threat detection module 106. In yet further embodiments, the process and sub-processes of FIG. 4 are performed jointly by the threat detection systems 150*a*-150*n* and the threat detection module 106. The aforementioned process and sub-processes of FIG. 4 are for example, performed automatically, but can be, for example, performed manually, and are performed, for example, in real time.

At step 402, a threat detection subsystems or the threat detection module 106 collects activity data (log data) from an enterprise. At step 404, the collected log data is aggregated over short periods (for example 10 seconds, i.e., "bursts") in different granularities. At step 406, MBIs are calculated from each set of aggregated data, and at step 408 sequences of activity are built on top of the calculated MBIs. At step 410, inferences are made from the MBIs and sequences to determine whether the sequences of activity are indicative of malicious intent. Step 410 is performed using an unsupervised learning algorithm, for example an unsupervised anomaly detection algorithm such as the Snorkel algorithm. The inferences at step 410 provide a score for each sequence of activities, which indicates how likely a sequence of activities leads to something malicious occurring on the enterprise.

Figure 5:
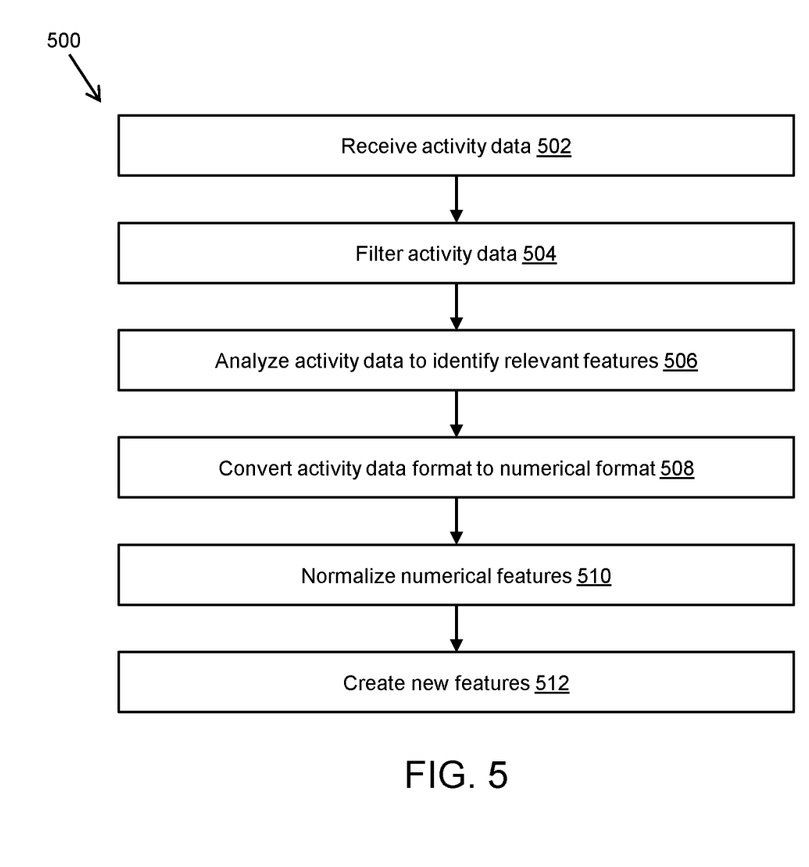
FIG. 5 is a flow diagram illustrating a process for processing data logs to be used for the process of FIG. 3, according to embodiments of the present disclosure.

With continued reference to FIGS. 1-4, refer now to FIG. 5, which shows a flow diagram detailing a computer-implemented process 500 in accordance with embodiments of the disclosed subject matter. This computer-implemented process includes an algorithm for, among other things, performing parts of step 306 of FIG. 3. In particular, the process 500 includes an algorithm for pre-processing activity data collected from an enterprise to produce conditioned data (a sequence of aggregated data). This process 500 can be generally repeated for each enterprise of the enterprises 160*a*-160*n*. The process and sub-processes of FIG. 5 are computerized processes performed by various components of, or otherwise associated with, the system 100, such as the data conditioning module 108. The aforementioned process and sub-processes of FIG. 5 are for example, performed automatically, but can be, for example, performed manually, and are performed, for example, in real time.

At step 502, the system 100 receives activity data (i.e., raw log data).

At step 504, the system 100 filters the activity data to remove irrelevant data, aggregate related events, or clean up any anomalies.

At step 506, the system 100 analyzes the activity data (logs) to identify features (attributes) that could be relevant for the ML model(s) of the supervised learning module 110. As discussed above, such features can include, for example, event names, event sources, user identities, source IP addresses, and the like.

At step 508, the system 100 converts the format of the activity data to numerical format by, for example, encoding categorical features of the activity data. The conversion can be performed, for example, using for one-hot encoding, label encoding, target encoding, and the like.

At step 510, the system 100 normalizes numerical features to ensure that the numerical features are on the same scale. The normalization can be performed using, for example, min-max scaling, standard scaling, robust scaling, and the like.

At step 512, the system 100 can create new features from the existing features to enrich the information provided to the ML model(s) of the supervised learning module 110. Creation of new features can, for example, involve creating interaction terms, aggregating features over time, calculating rolling statistics, and the like.

The implementation of the method and/or system of embodiments of the disclosure can involve performing or completing selected tasks manually, automatically, or a combination thereof. Moreover, according to actual instrumentation and equipment of embodiments of the method and/or system of the disclosed subject matter, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosed subject matter could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present disclosure. A non-transitory computer readable (storage) medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

The above-described methods including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The methods and systems, including components thereof, herein have been described with exemplary reference to specific hardware and software. The processes methods have been described as exemplary, whereby specific steps and their order can be omitted and/or changed by persons of ordinary skill in the art to reduce these embodiments to practice without undue experimentation. The methods and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the disclosed subject matter has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for detecting malicious behavior in enterprises, the method comprising:
    obtaining threat data, the threat data generated from activity data using unsupervised learning, the activity data collected from a plurality of enterprises and descriptive of activities performed in association with the enterprises, the threat data indicating a likelihood that sequences of activities performed in association with the enterprises are indicative of malicious intent;
    training at least one supervised machine learning model that processes sequential data by providing a training set of sequential data to each of the at least one supervised machine learning model, the training set including at least some of the obtained threat data and data derived from activity data collected from at least some of the plurality of enterprises;
    by each of the trained at least one supervised machine learning model, receiving as input new data descriptive of a sequence of activities performed in association with an enterprise and processing the received new data to produce a prediction of whether the sequence of activities performed in association with the enterprise will lead to a malicious action on the enterprise; and
    taking at least one action based on the prediction of whether the sequence of activities performed in association with the enterprise will lead to a malicious action on the enterprise, wherein the at least one action includes modifying a current security posture of the enterprise.

2. The method of claim 1, wherein the threat data is descriptive of sequences of activities performed in association with the enterprises during a first time-interval defined by a first start time and a first end time, and wherein the data derived from the activity data collected from the at least some of the plurality of enterprises is descriptive of activities performed in association with the at least some of the plurality of enterprises during a second time-interval defined by a second start time and a second end time, wherein the second time-interval overlaps with the first time-interval, and wherein the second start time precedes the first end time by a first amount of time.

3. The method of claim 2, wherein the second end time precedes the first end time by a second amount of time that is less than the first amount of time.

4. The method of claim 1, wherein obtaining the threat data includes:
    collecting the activity data from the plurality of enterprises, and
    generating the threat data from the collected activity data using an unsupervised learning technique.

5. The method of claim 1, wherein the at least one supervised machine learning model includes a transformer.

6. The method of claim 1, wherein the at least one supervised machine learning model includes exactly one supervised machine learning model.

7. The method of claim 1, wherein the at least one supervised machine learning model includes a plurality of supervised machine learning models, each supervised machine learning model trained using different respective parts of the obtained threat data such that each supervised machine learning model predicts a different type of malicious action.

8. The method of claim 1, wherein training the at least one supervised machine learning model includes identifying patterns in the activity data collected from the at least some of the plurality of enterprises that correspond to at least some of the obtained threat data.

9. The method of claim 1, wherein processing the received new data includes assigning, by each of the trained at least one supervised machine learning model, a confidence score indicative of a confidence that the sequence of activities will lead to a malicious action.

10. A computer system for detecting malicious behavior in enterprises, the computer system comprising:
    a non-transitory storage medium for executing computer components; and
    a computerized processor for executing the computer components comprising:
        a threat detection module configured to:
            obtain threat data, the threat data generated from activity data using unsupervised learning, the activity data collected from a plurality of enterprises and descriptive of activities performed in association with the enterprises, the threat data indicating a likelihood that sequences of activities performed in association with the enterprises are indicative of malicious intent,
        a supervised learning module that processes sequential data and is configured to:
            train based on a training set of sequential data that includes at least some of the obtained threat data and data derived from activity data collected from at least some of the plurality of enterprises, and
            once the supervised learning module is trained:
                receive as input new data descriptive of a sequence of activities performed in association with an enterprise, and
                process the received new data to produce a prediction of whether the sequence of activities performed in association with the enterprise will lead to a malicious action on the enterprise, and remediation module configured to:
    take at least one action based on the prediction of whether the sequence of activities performed in association with the enterprise will lead to a malicious action on the enterprise, wherein the at least one action includes modifying a current security posture of the enterprise.

11. The computer system of claim 10, wherein the threat data is descriptive of sequences of activities performed in association with the enterprises during a first time-interval defined by a first start time and a first end time, and wherein the data derived from the activity data collected from the at least some of the plurality of enterprises is descriptive of activities performed in association with the at least some of the plurality of enterprises during a second time-interval defined by a second start time and a second end time, wherein the second time-interval overlaps with the first time-interval, and wherein the second start time precedes the first end time by a first amount of time.

12. The computer system of claim 11, wherein the second end time precedes the first end time by a second amount of time that is less than the first amount of time.

13. The computer system of claim 10, wherein the threat detection module is configured to obtain the threat data by: receiving components of the threat data from a plurality of threat detection subsystems in communication with the plurality of enterprises, and compiling the received components to form the threat data.

14. The computer system of claim 11, wherein each threat detection subsystem is configured to: collect activity data from a corresponding one of the of enterprises, and generate a component of the threat data from the collected activity data using an unsupervised learning technique.

15. The computer system of claim 10, wherein the threat detection module is configured to obtain the threat data by: collecting the activity data from the plurality of enterprises, and generating the threat data from the collected activity data using an unsupervised learning technique.

16. A computer usable non-transitory storage medium having a computer program embodied thereon for causing a suitably programmed system to detect malicious behavior in enterprises, by performing the following steps when such program is executed on the system, the steps comprising:
    obtaining threat data, the threat data generated from activity data using unsupervised learning, the activity data collected from a plurality of enterprises and descriptive of activities performed in association with the enterprises, the threat data indicating a likelihood that sequences of activities performed in association with the enterprises are indicative of malicious intent;
    training at least one supervised machine learning model that processes sequential data by providing a training set of sequential data to each of the at least one supervised machine learning model, the training set including at least some of the obtained threat data and data derived from activity data collected from at least some of the plurality of enterprises;
    by each of the trained at least one supervised machine learning model, receiving as input new data descriptive of a sequence of activities performed in association with an enterprise and processing the received new data to produce a prediction of whether the sequence of activities performed in association with the enterprise will lead to a malicious action on the enterprise; and
    taking at least one action based on the prediction of whether the sequence of activities performed in association with the enterprise will lead to a malicious action on the enterprise, wherein the at least one action includes modifying a current security posture of the enterprise.

17. The computer usable non-transitory storage medium of claim 16, wherein the threat data is descriptive of sequences of activities performed in association with the enterprises during a first time-interval defined by a first start time and a first end time, and wherein the data derived from the activity data collected from the at least some of the plurality of enterprises is descriptive of activities performed in association with the at least some of the plurality of enterprises during a second time-interval defined by a second start time and a second end time, wherein the second time-interval overlaps with the first time-interval, and wherein the second start time precedes the first end time by a first amount of time.

18. The computer usable non-transitory storage medium of claim 17, wherein the second end time precedes the first end time by a second amount of time that is less than the first amount of time.

* * * * *